March 29, 1927.
N. H. HILLER ET AL
CONDENSER OR COOLER
Filed Feb. 11, 1924
1,622,645
3 Sheets-Sheet 2
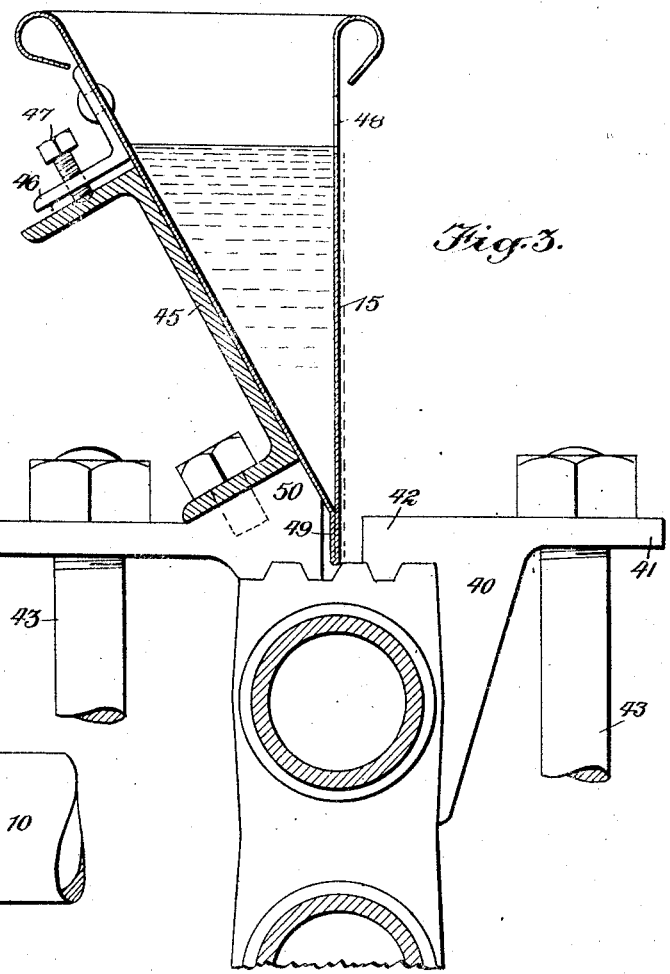
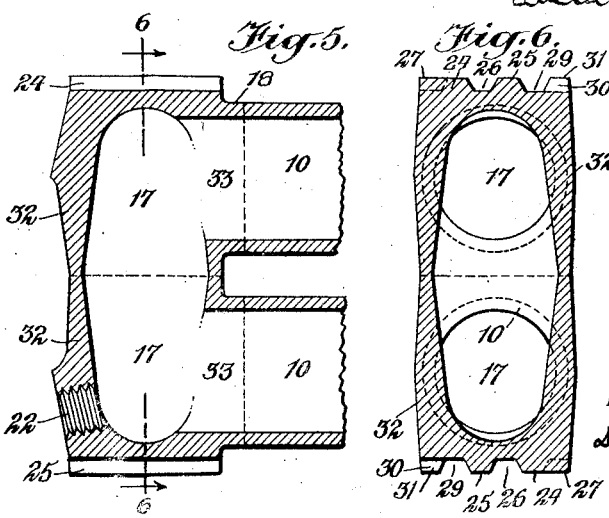
INVENTORS
Nicolai H. Hiller
Bror F. Sjoberg
BY
Dean Fairbank Obrieyes & Hirsch
ATTORNEYS

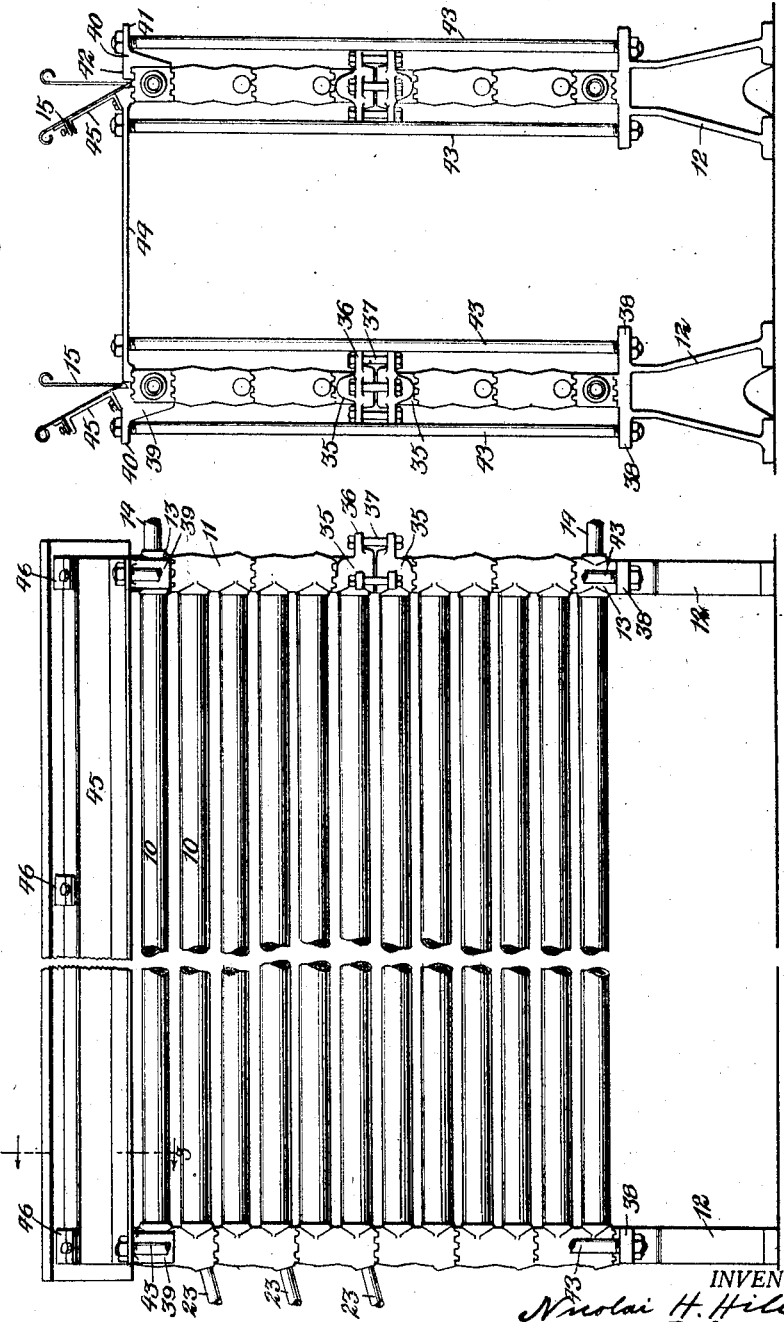

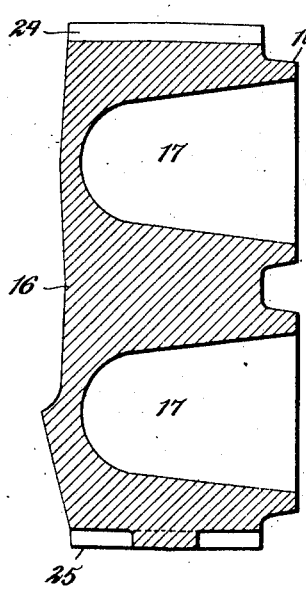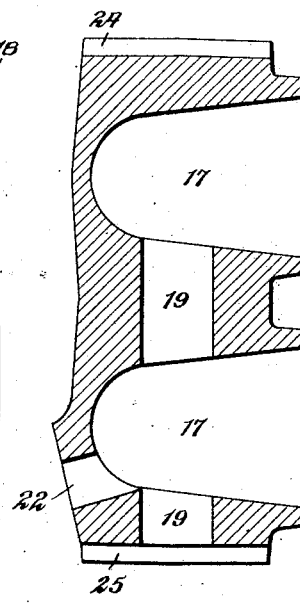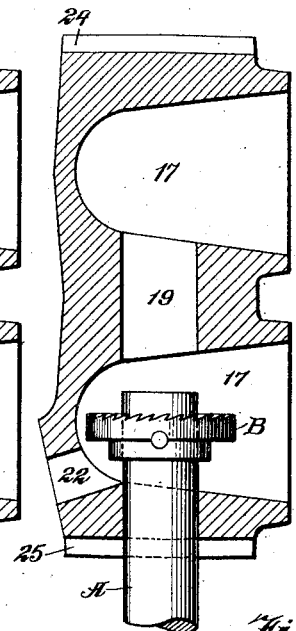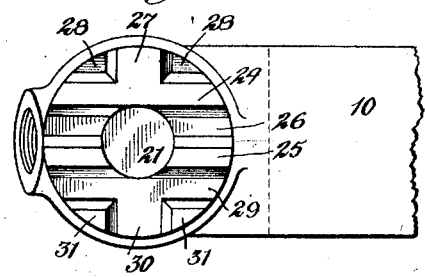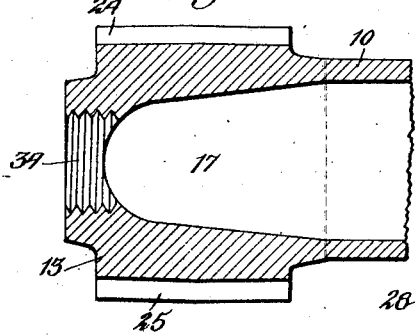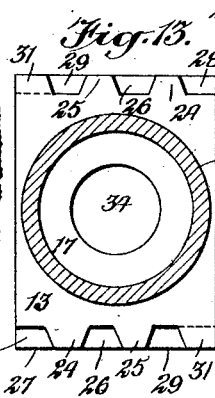

Patented Mar. 29, 1927.

1,622,645

UNITED STATES PATENT OFFICE.

NICOLAI H. HILLER AND BROR F. SAFBERG, OF CARBONDALE, PENNSYLVANIA, ASSIGNORS TO CARBONDALE MACHINE COMPANY, OF CARBONDALE, PENNSYLVANIA, A CORPORATION OF PENNSYLVANIA.

CONDENSER OR COOLER.

Application filed February 11, 1924. Serial No. 691,927.

This invention is an improvement in heat interchangers of that type in which a fluid is caused to flow through a zig zag path made up of a series of parallel runs and return bends or elbows while in heat interchanging relationship with another fluid.

In apparatus of this character, particularly in coolers in which the cooling fluid is caused to flow over the outer surface of the zig zag conduit, one of the main causes of depreciation is the corrosive effect or rusting which takes place in the pockets, angles or crevices between the conduit and the supports, clamps, brackets, bolts and other parts employed in connection therewith.

One object of our invention is to reduce to a minimum the number of such clamps, brackets, bolts, supporting members and other attachments so as to thereby reduce the number of points at which rusting may occur and thereby increase the life as well as decrease the initial cost of the apparatus. We seek particularly to avoid the use of any such parts in contact with the surfaces of the pipes themeselves which are thinner and more subject to destruction by corrosive action than several return bends which are of heavier and thicker material.

As one important feature the return bends or elbows and the inlet and outlet coupling connections are made of drop forgings directly welded to the pipe ends to avoid the threading of the pipes and the use of packings or gaskets.

As another important feature these forgings are so designed that they rest directly upon each other to thereby avoid individual supports and permit the pipes to be brought closer together. This close spacing of the pipes permits the elimination of distributing strips or fins between the pipes and the corrosion of the pipes at the clamps for supporting such strips or fins.

As another important feature the supporting surfaces of these elbows or bends are so formed as to accurately position them in respect to each other and prevent any lateral or endwise sliding movement. A single clamping device may thus hold the entire series of superposed elbows in proper position and rigid in respect to each other.

A further important feature is to provide a simple and effective means for connecting a series of conduits in spaced parallel planes, and which means may be secured directly to the elbows or inlet or outlet couplings.

As a further important feature we so design the connecting means between series of conduits that they also serve as a part of the clamping means for holding together the elbows of each individual conduit.

A further object is to provide a simple and effective supporting and adjusting means for the sprinkling trough, particularly on coolers having long pipe lengths. These troughs are ordinarily of galvanized sheet iron and to get satisfactory spread of the water they should be brought as close as possible to the upper pipe section, but a long trough of this character does not have sufficient rigidity to permit of supporting it only at the ends. To provide intermediate supports from the upper pipe gives an opportunity for corrosion of the pipe at the support and renders difficult the proper adjustment of the trough to get uniform delivery of water along the full length of the pipe. In our improved construction the trough is supported by adjusting means at as many points along its length as is desired, but from a rigid supporting member carried by the end clamping means. The trough may thus be brought as close as desired to the upper pipe to give effective and uniform distribution of the water but without directly engaging with said pipe.

In the accompanying drawings:

Fig. 1 is a side elevation of a cooler constructed in accordance with our invention.

Fig. 2 is an end elevation.

Fig. 3 is a sectional detail through the sprinkling trough and associated parts and on a larger scale, Fig. 4 is a top plan view of one return bend with the pipe welded thereto, Fig. 5 is a central longitudinal section of the parts shown in Fig. 4, Fig. 6 is a section on the line 6—6 of Fig. 4.

Fig. 7 is a central longitudinal section of a forging from which a return bend may be made, Figs. 8, 9 and 10 are sections similar to Fig. 7, but showing successive steps in the manufacture of the return bend.

Fig. 11 is an inverted plan view of the construction shown in Fig. 10.

Fig. 12 is a central longitudinal section of an inlet or outlet pipe connection, and Fig. 13 is an end view of the parts shown in Fig. 12.

The cooler illustrated is made up of a series of pipes 10 connected to form a zig zag conduit by return bends 11 arranged in superposed relationship and supported on foot stands 12. The upper and lower pipes are provided with outlet and inlet coupling members 13 for supply and outlet pipes 14. The pipes 10 are cooled by water trickling over them from a trough 15 extending lengthwise of and spaced above the upper pipe 10.

In our improved construction there are employed return bends which may be constructed substantially as shown in Figs. 7 to 12 inclusive. The bend here shown is formed from a drop forging 16 which is provided with a pair of pockets or chambers 17 extending inwardly from one face thereof and encircled at their outer ends by bosses or flanges 18. These two chambers are adapted to communicate directly with the ends of two pipes and at said ends are of an internal diameter approximately equal to the internal diameter of the pipe to which the return bend is to be connected.

A hole 19 is then drilled through the bottom into one chamber and through the partition or web between the two chambers, as shown in Fig. 8. This hole is made of the proper size to receive and guide the shank or shaft of a cutter bar A which may be inserted through the lower portion of the hole 19. A cutter head B may then be attached to the bar A and the tool advanced to enlarge the hole through the web to form a passage 20 of a diameter approximately equal to the diameter of the pipes to which the return bend is to be connected. The tool may then be removed and the end of the hole 19 closed by a plug 21 which may be welded or otherwise permanently secured in place, as shown in Figs. 10 and 11. If desired a drain hole 22 may be drilled through the outer wall of the bend into the lower chamber 17 and this may be tapped to receive drainage or draw-off pipes 23, as shown at the left hand side of Fig. 1. If such drainage is not necessary in the type of apparatus which is to be constructed, there is no need to drill the hole 22. The flanges or bosses 18 are machined if necessary to present a smooth circular face which may be directly welded to the main cooler pipes 10 as indicated by the dotted lines in Figs. 10 and 11. The return bend thus forms an integral connection between the two adjacent pipes and there is no necessity for packings or clamping members of any kind. Furthermore the forging may be made with the chambers 17 as close together as desired so that there may be a materially shorter space between two adjacent pipes 10 than is the case where the pipes are threaded into the bend or where the bend is made of two sections clamped together with an interposed gasket. As one important feature the return bend is provided with upper and lower surfaces whereby each bend may rest directly upon the one below. These surfaces are so constructed that they may be formed during the forging of the part, and without finishing machining operation, and so that they prevent any lateral or transverse sliding of one return bend on the other. By making longitudinal grooves and ridges on the upper and lower surfaces, the bends may slide longitudinally on each other or may properly interengage even if the pipes vary slightly in length, but lateral or transverse movement is prevented. By providing transverse grooves and ridges, longitudinal sliding is also prevented. Preferably we use only the longitudinal grooves and ridges but have illustrated both sets. The lower surface of each bend may have a pair of ridges 24 and 25 having inclined side walls and separated by a groove 26. One of the ridges 24 may be provided with a transversely extending ridge 27 at right angles thereto and with depressions 28 at each side thereof. At the opposite edge, the groove 29 alongside of the ridge 25 may have a transversely extending groove 30 at right angles thereto and between projections 31. The ridges and grooves are so positioned and proportioned that surface irregularities thus formed at one side of the medial line are the reverse of those at the other side. In other words these surface irregularities upon opposite sides of the medial line are complementary to each other. The upper surface is formed in the same way as the lower surface but complementary to the latter. In other words the laterally extending groove 30 on the bottom is directly below the laterally extending ridge 27 on the top, and directly above the groove 26 of the bottom is the ridge 25 of the top. These ridges and grooves fit together as the return bends are superposed on one another, and they resist both lateral and longitudinal sliding movement of the parts. Furthermore they are of such design that they may be formed by the dies in the forging of the bend, and without machining operation. The only machining operation necessary is fitting the bosses 18 for welding to the pipes and the cutting of the passage 20, and if desired, the drilling and tapping of the hole 22. The return bend above described is formed of a single forging, but if desired the bend may be made up of two halves or sections 32 welded together along the dotted line, as shown in Figs. 4, 5 and 6. In this case the chambers 17 are so formed that their larger open ends are directly connected in welding together the two halves or sections 32, and passages 33 may be drilled into these chambers and through bosses 18 which are later welded to the pipes 10. The upper and lower surface of the halves or sections 32 may be constructed with the same ridge and groove arrangement of surface irregularity hereinbefore described.

For forming the coupling members 13 for the supply and outlet conduits there may be employed drop forgings of the type shown in Figs. 12 and 13. Here the body portion has a chamber 17 to the open end of which may be welded the end of a pipe 10. The upper and lower surface may be provided with the same type of ridge and groove construction hereinbefore described, and a hole 34 may be drilled through the wall of the forging in alignment with the pipe 10 to receive the supply or outlet pipe 14.

A cooler of any desired height may be built up by welding together the pipes and return bends as above described. In case a cooler having a large number of pipes is to be employed and it is not convenient to handle the entire device as a unit in welding or shipping it may be made up of sections which may be later bolted together. If this is to be done we employ a return bend made up of two separate sections or halves 35 which are similar to the halves 32 but provided with means such as lugs 36 and bolts 37 for detachably securing the two halves together rather than welding them together as shown in Figs. 5 and 6.

By reason of the improved construction hereinbefore described it is not necessary to provide the return bends with any lugs or other clamping means for holding them together. It is sufficient to merely clamp together the entire series. For this purpose we provide the foot stands with the proper surface configuration to support and position the lower coupling member 13 and provide the foot stands with outwardly extending lugs 38. At the top there are provided a pair of brackets 39 and 40 each of which has an outwardly extending lug 41 and a flange 42 adapted to rest upon the upper surface of the upper coupling member 13 or return bend 11. The flange 42 extends less than half way across the upper surface of the forging and has its under surface provided with surface irregularities complementary to the surface upon which it is to rest. These brackets 39 and 40 are not identical due to the difference in the character of the upper surface at the right and left hand sides of a bend or coupling member. These brackets 39 and 40 are connected to the lugs 38 of the foot stands by bolts 43 so that by tightening the nuts on the ends of these bolts the entire structure is rigidly connected together.

In case it is desired to employ a plurality of conduits as separate parallel units, it is preferable to use only a single pair of brackets 39 and 40, one being for the left hand unit and the other for the right hand unit, as shown in Fig. 2, and to connect the units by a brace 44 which has its terminal portions provided with proper surface irregularities for engagement with the upper surface portions of the bends or coupling members, and with apertures to receive the tie bolts. Thus the braces 44 serve not only to hold the units in spaced relationship, but also as a part of the means for holding together the parts of each unit. The surface irregularities thus serve not only to prevent lateral movement of one return bend on another, but they also serve to prevent the brackets and braces from sliding off the upper surfaces of the upper bends and coupling members.

For the cooling of the fluid passing through the conduit there is provided a single trough 15 which is preferably formed of galvanized sheet iron and of approximately V shape in vertical section. For supporting the trough there is provided a supporting member 45 here shown as a channel iron extending the full length of the cooler and set with its web in an inclined plane to rest in direct contact with an inclined surface of the trough. Above the edge of the channel iron this inclined side wall of the trough is provided with short angle iron brackets each of which may have a set screw 47 extending therethrough on to the upper flange of the channel. By adjusting these set screws the trough may be brought to a horizontal position and to permit the uniform distribution of water through the outlet notches of openings on the vertical side of the trough. At the lower edge of the vertical wall there is a flange 49 for guiding the water on to the upper surface of the upper pipe 10. The heavy channel iron is of such cross-sectional form that it is not liable to warp or bend and therefore it holds the trough against any lateral movement out of the proper vertical plane and it permits of the vertical adjustment of the trough at a plurality of points along the length to give the proper uniform delivery of the cooling water.

As another important feature of the invention the bracket 39 and one end of each of the braces 44 serve as supports for the channel iron 45. To give the proper inclination to the channel iron each bracket 39 and one end of each brace 44 has a lug 50 with an inclined surface and to which may be bolted the lower flange of the channel. Thus the bracket 39 serves not only as an anchorage for the upper end of the tie bolt 43, but also as a support for the channel iron which carries the sprinkling trough.

In our improved construction there are thus the minimum number of parts, the pipes 10 are brought as close together as desired, and there are no braces or clamping means of any kind which engage with any of the pipes 10 intermediate of their ends. There are the minimum crevices and angles in which water may stand and rusting or other corrosion begin. The machining operations are reduced to a minimum which reduces the cost of manufacture and adjustment of the trough is secured in a simple and easy manner. In case the cooler be of such length that there is any tendency of the pipes 10 to sag intermediate of their ends, we may and preferably do bend each pipe slightly before assembling and weld the parts with the bend extending upwardly. This bend may not amount to more than a quarter of an inch and will serve to neutralize the sagging tendency and result in the pipes 10 maintaining parallel horizontal positions. Although we prefer to weld the pipes to the return bends, we may in some cases make the bosses 18 thicker and thread the pipes into them and still employ the other features of our invention.

Having thus described our invention, what we claim as new and desire to secure by Letters Patent is:—

1. A zig zag conduit including a series of substantially parallel runs of pipe and return bends welded thereto and connecting said pipes in series, the upper and lower surfaces of said bends being imperforate and presenting irregularities adapted to interengage with complementary irregularities of the adjacent bend.

2. A zig zag conduit including a series of substantially parallel pipe sections and return bends connecting said sections in series, each bend directly engaging with an adjacent bend, and having the upper and lower surfaces thereof provided with complementary ridges and grooves.

3. A zig zag conduit including a series of substantially parallel pipe sections and return bends connecting said sections in series, each bend directly engaging with an adjacent bend, and having the upper and lower surfaces thereof provided with complementary ridges and grooves extending in a direction parallel to that of the pipe sections.

4. A zig zag conduit including a series of substantially parallel pipe sections and return bends connecting said sections in series, each bend directly engaging with an adjacent bend, and having the upper and lower surfaces thereof provided with complementary ridges and grooves extending in a direction substantially at right angles to the pipe sections.

5. A zig zag conduit including a series of substantially parallel pipe sections and return bends connecting said sections in series, the imperforate upper and lower surfaces of each bend being provided with alternate depressions and projections, those on the upper surface being complementary to those on the lower surface whereby the bends may be directly supported one above the other, and with the projections and depressions interengaging to prevent transverse movement of each bend in respect to the others.

6. A zig zag conduit including a series of substantially parallel pipe sections, and a plurality of bends connecting said sections in series, said bends being electrically welded to said pipe sections and each bend having its upper and lower surfaces imperforate and provided with complementary projections and depressions.

7. A zig zag conduit including a series of substantially parallel pipe sections, a plurality of bends connecting said sections in series, said bends being electrically welded to said pipe sections and each bend having its upper and lower surfaces imperforate and provided with complementary projections and depressions, a foot stand, and clamping means connecting said foot stand and the uppermost return bend.

8. A zig zag conduit including a series of substantially parallel pipe sections, a plurality of bends connecting said sections in series, said bends being electrically welded to said pipe sections and each bend having its upper and lower surfaces provided with complementary projections and depressions, a foot stand, and clamping means connecting said foot stand and the uppermost return bend, said foot stand and said clamping means having complementary depressions and projections for engaging with the corresponding surfaces of the lower and upper bends.

9. In combination a series of substantially parallel pipe sections, a plurality of return bends connecting said sections together in series, a foot stand, each of said return bends adapted to rest directly upon the bend below the same with the lowermost bend resting on said foot stand and each of said bends and said foot stand having interengaging surfaces for preventing relative transverse movement, and means for clamping the uppermost bend to said foot stand.

10. In combination a zig zag conduit including parallel pipe sections and return bends electrically welded thereto and connecting the pipe sections in series, each of said bends adapted to rest directly upon the bend below, a foot stand for supporting the lowermost bend, a bracket engaging with the uppermost bend, and tie bolts connecting said foot stand and said bracket.

11. In combination a pair of zig zag conduits arranged in parallel vertical planes and each including a series of pipe sections and return bends, each return bend resting directly upon and supported by the bend therebeneath, means for supporting the lower bends, a brace having one end resting upon the upper bend of one conduit and the opposite end resting upon the upper end of the other conduit, and means for connecting said brace to said supporting means.

12. A construction as defined in claim 14, in which the bends have complementary surface irregularities upon the upper and lower surfaces thereof, and in which the brace engages with the surface irregularities of the upper surface of the upper bend.

13. In combination a zig zag conduit including a series of substantially parallel pipe sections and bends connecting them in series, said bends directly engaging with each other and each bend serving to support the one above, the lower bend having a plurality of longitudinally and transversely extending grooves and ridges, a foot stand having complementary grooves and ridges for engaging with said last mentioned bend to prevent lateral movement of the latter, and means for engaging with the upper bend for clamping the conduit on to said foot stand.

14. In combination a conduit including a series of parallel pipe sections and return bends connecting them in series, the upper and lower surface of each bend having complementary surfaces for interengagement with those of the adjacent bends, a bracket having a flange provided with an under surface for directly engaging with the upper surface of the upper bend, and a flange for engaging with the side of the upper bend, a foot stand, and means for connecting said bracket on said foot stand to rigidly connect the superposed series of bends.

15. In combination a zig zag conduit having a plurality of pipe sections and return bends, each bend adapted to rest directly upon and be supported by the one therebeneath, means for rigidly connecting said bends including brackets resting upon the upper bends, and a sprinkling trough supporting member rigidly secured to the brackets at opposite ends of the upper pipe section.

16. In combination a pair of spaced cooler conduits disposed in parallel vertical planes and each including a plurality of pipe sections and return bends connecting them in series, each bend being adapted to rest directly upon the bend therebeneath, a pair of braces each having one end resting upon an upper bend of one conduit and the opposite end resting upon the upper bend of the other conduit, means for supporting said conduits, tie bolts connecting said braces to said supporting means, a sprinkling trough supporting member and extending lengthwise of the upper pipe section of said conduit and secured to and supported by said braces.

17. A return bend for zig zag conduits including a drop forging having a pair of spaced chambers adapted to communicate with the ends of spaced parallel pipes, a passage connecting said chambers, and complementary surface irregularities upon the upper and lower imperforate surfaces adapting each bend to rest upon a lower one and support an upper one and resist lateral movement in respect to said upper and lower bends.

18. A return bend for zig zag conduits having upper and lower imperforate surfaces provided with complementary surface irregularities.

19. A return bend for zig zag conduits having upper and lower imperforate surfaces provided with complementary grooves and ridges for engagement with corresponding ridges and grooves of similar bends, whereby they may be stacked in series each resting upon the one therebeneath and held against lateral movement in respect thereto.

Signed at Carbondale in the county of Lackawanna and State of Pennsylvania this 6th day of February 1924.

NICOLAI H. HILLER.
BROR F. SAFBERG.